Patented Sept. 23, 1924.

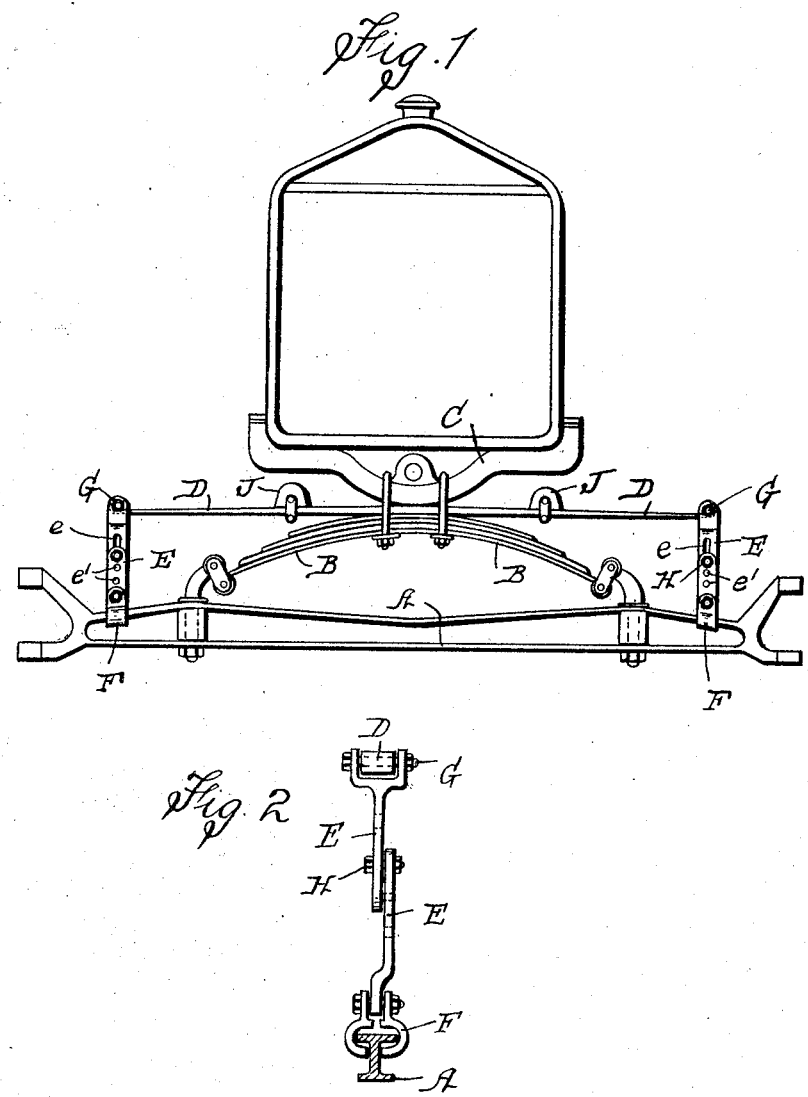

1,509,618

UNITED STATES PATENT OFFICE.

CHARLES WALDERMAR NORMAN SORENSEN, OF HAMILTON, NEW ZEALAND.

SHOCK ABSORBER AND STABILIZER FOR MOTOR VEHICLES.

Application filed June 4, 1923. Serial No. 643,359.

*To all whom it may concern:*

Be it known that I, CHARLES WALDERMAR NORMAN SORENSEN, subject of the King of Great Britain, residing at Brookfield Street, Hamilton, Dominion of New Zealand, have invented a new and useful Shock Absorber and Stabilizer for Motor Vehicles, of which the following is a specification.

This invention has reference to that class of motor vehicles in which the body is suspended on the underframing by transversely extending bow springs positioned longitudinally with the axles and shackled thereto at their ends, and at their middle coupled rigidly to the body. A characteristic example of this class of construction is contained in the well known Ford motor vehicles.

The bodies thus suspended rock transversely with the road shocks, and the present invention has been devised with the object of providing improved means whereby this rocking motion may be cushioned, the running shocks absorbed, and the body stabilized.

The means devised for this purpose consist in a flat spring leaf (or if required, a number of spring leaves coupled together in the usual way) that is disposed to extend longitudinally with the axle and between the body and the ordinary suspension spring, so that the body is borne thereon, each end of said spring being attached to the corresponding end of the axle beneath by a link extending vertically between them. This link is capable of being adjusted in its length so that the tension of the spring may be regulated.

The attachment therefore serves to restrain the rebound of the body upon its suspension spring and thereby to lessen the side rocking of the body, while permitting of the free up and down cushioning of the suspension spring.

The invention is illustrated in the accompanying drawings, in which:—

Figure 1 is a front elevation of the forward suspension means of a motor vehicle, showing the attachment fitted in working position thereon.

Figure 2 is a side elevation of the link for connecting the attachment end with the axle.

A is the front axle, B the usual overslung bow spring suspended above the axle to extend longitudinally therewith, and C is the vehicle body frame that is made fast to the top of the bow in the usual way.

D is the stabilizing or shock absorbing spring forming the subject of this invention. This is made, as shown in the drawings, of a single strip of spring steel, of a strength increasing from each end to the middle, that is disposed between the top of the main spring B and the body C so that it extends longitudinally along above such main spring for approximately the full length of the axle A. Each end of this spring D is then connected to the axle beneath by means of the link E, which link is made adjustable in length in order that the tension of the spring may be adjusted at will.

This adjustment of the link's length is obtained by forming it of two members. One of these members has its lower end fastened within the clamp F that is clamped on to the axle A. The other member has its upper end made to receive the end of the spring D and to be fastened thereto by the cross bolt G. The top end of the lower member then overlaps the bottom end of the upper member and is bolted firmly thereto, so as to form a rigid whole, by means of the bolt H passing through them. Adjustability in length is provided for by having one member made with the slot $e$ extending longitudinally along it and the other with a number of holes $e'$ at intervals in its length and through which the bolt H is capable of passing.

It will be apparent that a spring thus fitted and connected at its ends directly by coupling with the axle, will act to cushion the body of the vehicle in its movements upon the main spring.

The spring D instead of being made of a single leaf thickened at its middle, may be made of a number of leaves clamped together in the usual way to provide for the increasing strength to the middle of its length.

The spring D may be provided with rubber or like buffers J fixed to its top, one on each side of its centre, to act as cushions for the engagement of the vehicle body with the spring in the up and down movements of the body. It will therefore also be apparent that by this engagement of the body with the spring D in the cushioning of the body upon its suspension spring, the possibilities of the sideways rocking of the body upon its point of suspension will be greatly minimized.

I claim:—

In a vehicle, the combination, with the body, an axle therebeneath, and a main bow spring interposed between the two and connected at the top of its bow to the body and its ends to the axle; of an auxiliary shock-absorbing and stabilizing spring interposed between the main spring and the body and arranged parallel with the former and the axle and in the vertical plane thereof; and a depending coupling link between each end of the auxiliary spring and the adjacent axle end but free of connection with the main spring; each link embodying upper and lower members having their inner ends overlapped, the upper member having its outer end formed to receive the adjacent end of the auxiliary spring and fastened to the same, and the lower member having its outer end clamped to the axle, the inner end of one member of the link being provided with a longitudinal slot and the inner end of the other member being provided with a longitudinal series of bolt holes, and a bolt interchangeably engaged in said holes and projecting through said slot to adjustably connect the overlapping ends of the two members together and thereby vary the length of the link and the tension of the auxiliary spring.

In testimony whereof, I affix my signature.

CHARLES WALDERMAR NORMAN SORENSEN.

Witnesses:
DAVID BROWN HUSTON,
ARTHUR SYDNEY GRAHAM.